Figure 1:
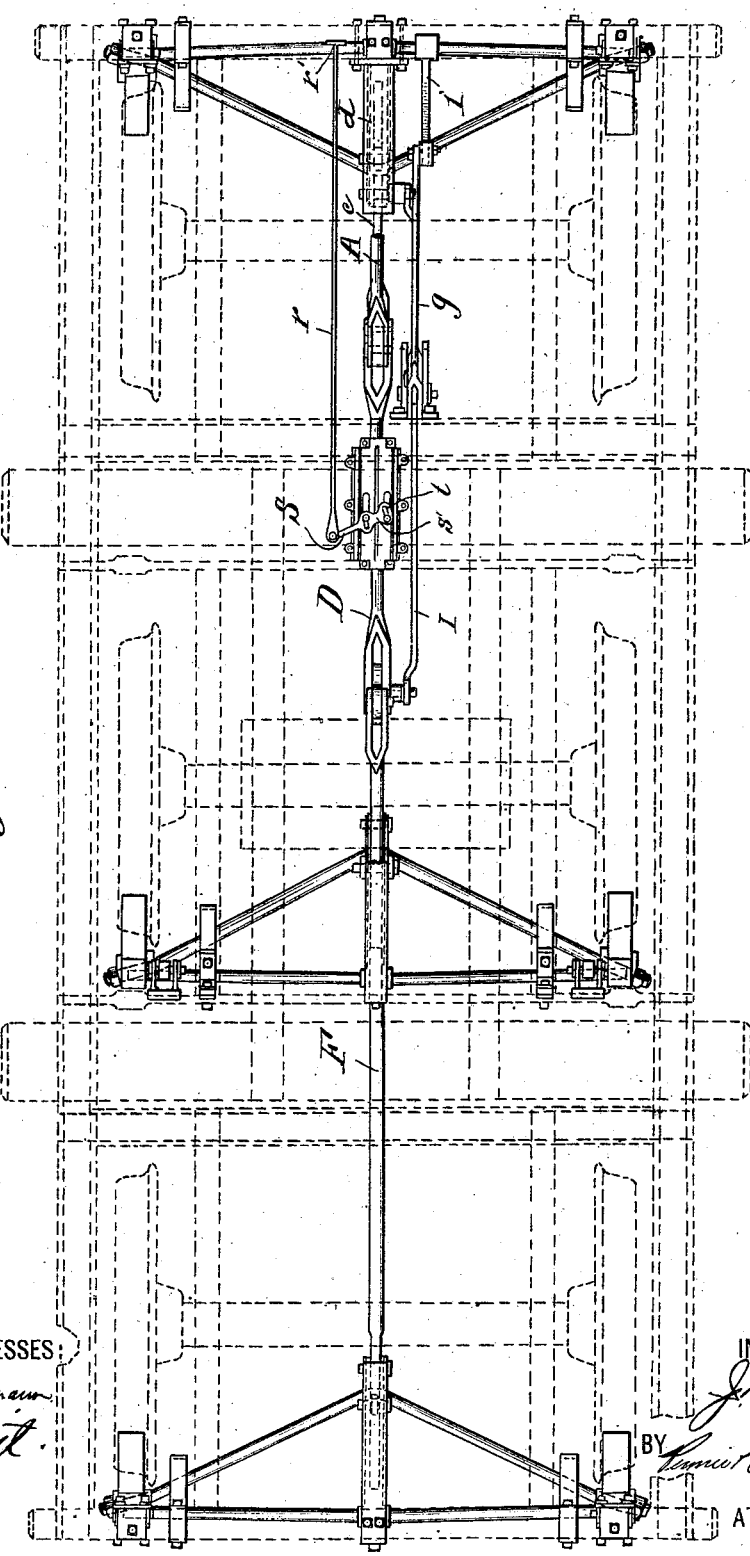

No. 878,065. PATENTED FEB. 4, 1908.
J. M. HINES.
BRAKE APPLYING MECHANISM.
APPLICATION FILED NOV. 4, 1907.

3 SHEETS—SHEET 1.

WITNESSES
INVENTOR:
BY
ATTORNEYS.

No. 878,065. PATENTED FEB. 4, 1908.
J. M. HINES.
BRAKE APPLYING MECHANISM.
APPLICATION FILED NOV. 4, 1907.
3 SHEETS—SHEET 2.
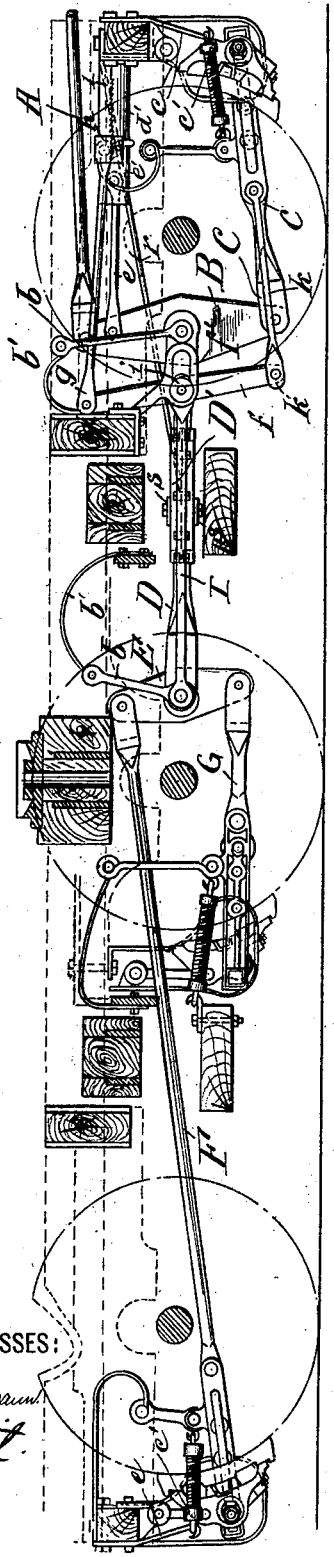
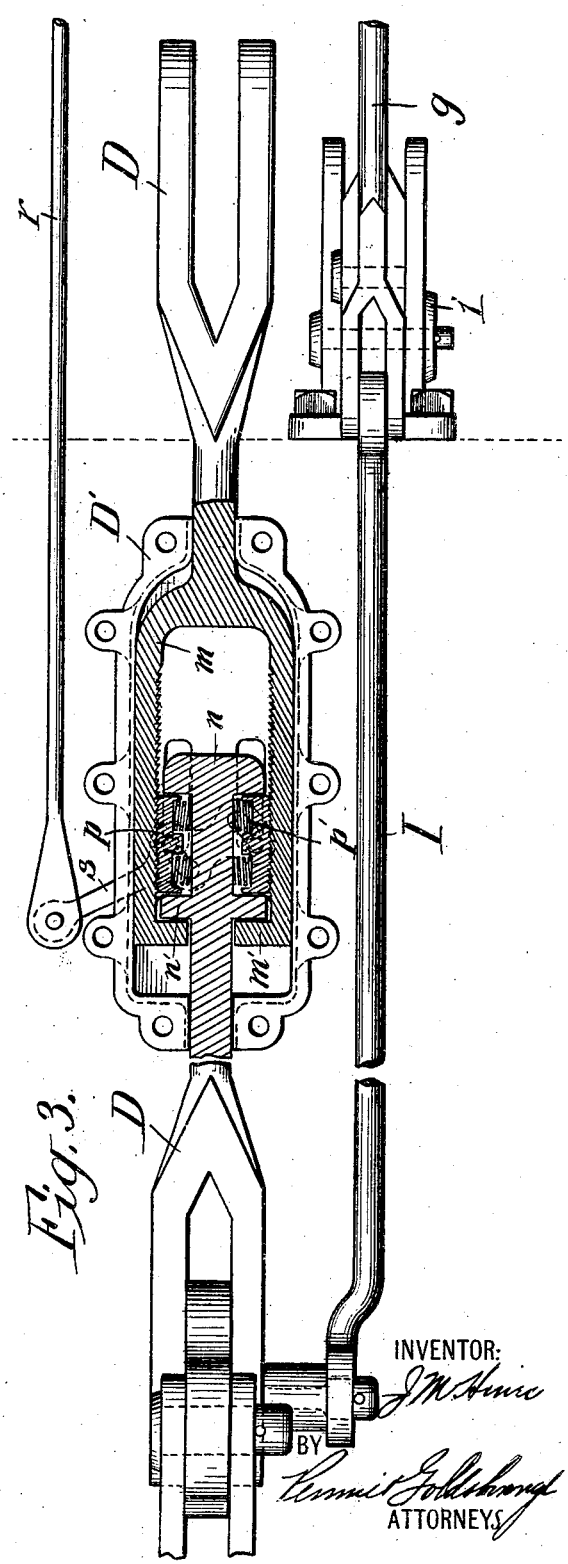
WITNESSES:
INVENTOR:
BY
ATTORNEYS

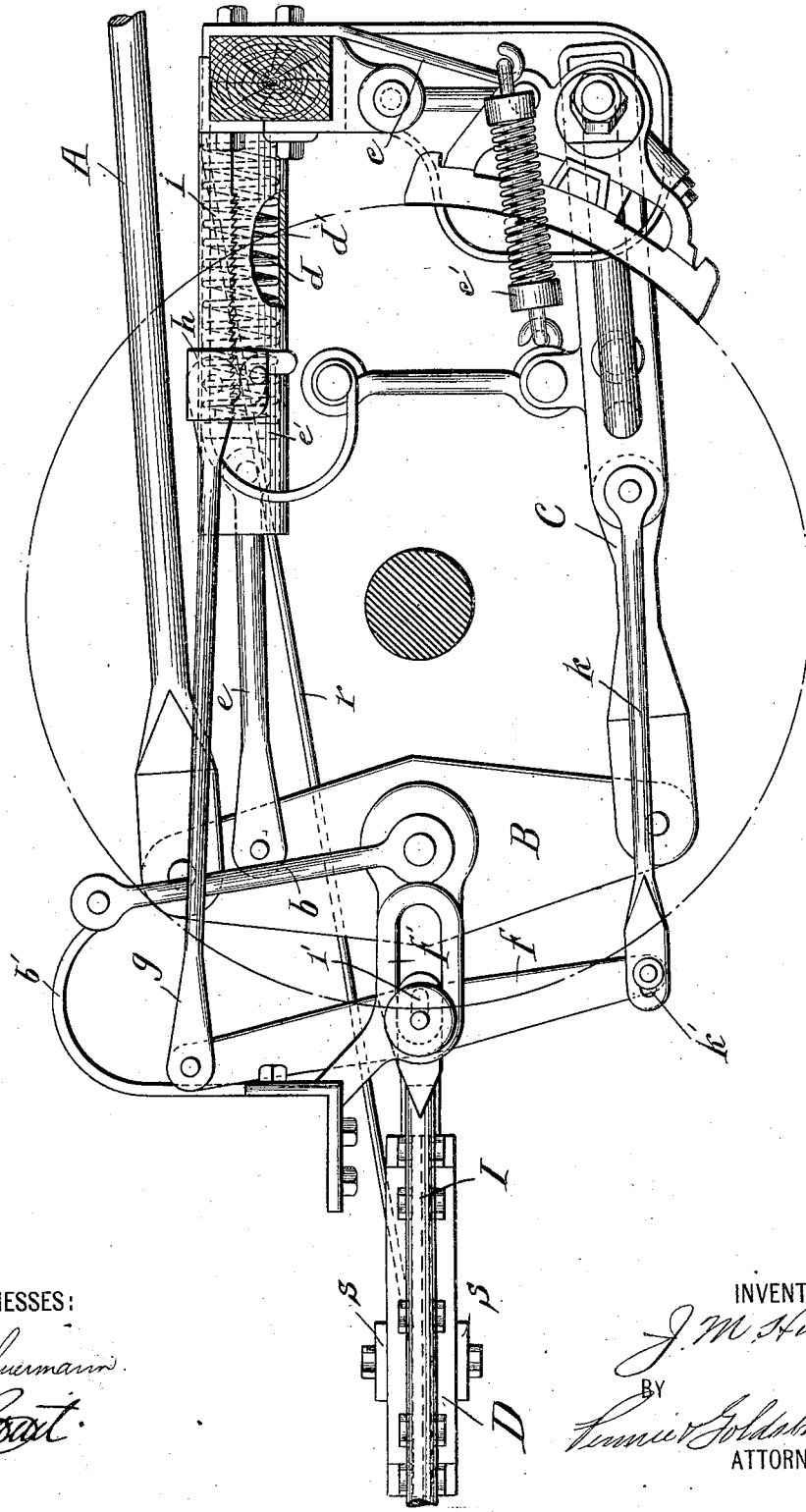

UNITED STATES PATENT OFFICE.

JAMES M. HINES, OF ALBANY, NEW YORK.

BRAKE-APPLYING MECHANISM.

No. 878,065.  Specification of Letters Patent.  Patented Feb. 4, 1908.

Application filed November 4, 1907. Serial No. 400,618.

*To all whom it may concern:*

Be it known that I, JAMES M. HINES, a citizen of the United States, residing at Albany, in the county of Albany and State of New York, have invented certain new and useful Improvements in Brake-Applying Mechanism; and I do hereby declare the following to be a full, clear, and exact description of the invention, such as will enable others skilled in the art to which it appertains to make and use the same.

My improvements are particularly adapted to brake applying mechanism for six-wheel trucks.

The nature and objects thereof will be best understood from a consideration of the following description and the accompanying drawings in which the same reference characters denote like parts throughout.

In the drawings, Figure 1 is a plan view showing the brake applying mechanism in its entirety as applied to a six-wheel truck. Fig. 2 is an elevation longitudinally of the truck body showing the mechanism in its entirety. Fig. 3 is a plan view partly in section of the take-up for adjusting the length of the intermediate lever on an enlarged scale and Fig. 4 is an elevation of the mechanism at one end of the truck frame on an enlarged scale.

The brake-applying rod A is attached to the upper end of the primary live lever B. To the lower end of the primary live lever is connected the brake rod C for the front pair of wheels. This rod is connected to the brake beam strut in the usual manner. The brake beams are hung from the ordinary swinging links and are provided with the customary guard brackets. The intermediate rod D extends from the center of the primary live lever B rearwardly to the center of the secondary live lever E which is connected at its upper end through the rod F to the brake beam of the rear pair of wheels and at its lower end through the rod G to the brake beam of the middle pair of wheels. The live lever B is supported by the swinging link $b$ and the bent spring $b'$ from the forward cross beam of the truck, and the live lever E and the brake beam struts of the rear and middle wheels are similarly supported. In place of the customary bent release springs extending from the end pieces of the truck to the brake beams I provide depending hooks $c$ to the lower ends of which are attached spiral springs $c'$ stretched between the depending hooks and a fixed point on the brake beam struts as shown in Figs. 2 and 4, or on the middle wheels the release spring is connected between the hook on the adjacent spring plank and a similar fixed point on the brake beam strut. For the purpose of returning the live lever to a full release position, I provide a heavy coiled spring $d$ mounted between the forward end-piece of the truck frame and the live lever. I prefer to inclose this spring in a cylindrical casing $d'$ and to connect it with the live lever through the connection of the intermediate rod $e$ which has a head formed as a piston $e'$ fitting in the cylindrical casing $d'$. The mechanism so far described presents a complete brake applying and releasing mechanism, but does not provide for taking up the slack due to the wear of the brake shoes, the stretch of the connecting rods, etc.

For the purpose of taking up this slack I provide the additional mechanism shown, the construction and operation of which will now be described. The floating lever $f$ is mounted in the slotted brackets $f''$ depending from the forward cross-piece of the truck frame. The upper end of this floating lever is connected through the rod $g$ to a pawl box $h$ sliding on the toothed rack $i$ extending from the inner side of the end-piece of the truck frame. In the construction shown the upper surface of this rack is flat and the teeth are on the lower surface, the pawl box being so constructed that its pawl engages the teeth of the rack in the manner shown in Fig. 4. The lower end of the floating lever is connected to the pin joining the brake rod of the forward brakes and its brake-beam strut by the rod $k$ which has at its rear end a slot $k'$ of a sufficient length to give a lost motion equivalent to the ordinary range of movement of the brakes in application and release. From the center of the floating lever $f$ a connecting rod I (see Fig. 3) extends back to the center of the live lever E. This rod has a slot $l'$ at its forward end of the same range as the slots $k'$ in the rod $k$.

Interposed in the intermediate rod D is a slack take-up box D'. Within this box one portion of the rod D is enlarged to form a yoke $m$. On the end of the other portion of the rod D is a head $n$ which slides within the yoke $m$ and is prevented from disengagement therewith by a crosspiece $n'$ which engages with lips $m'$ on the yoke. The inner faces of the yoke $m$ have formed on them toothed racks with the teeth inclined toward the forward end of the truck. The head n is recessed to contain toothed cheek blocks p which are normally forced into engagement with the teeth on the racks by the springs p' as shown in Fig. 3, which illustrates the normal operating position of the parts. In order that the brakes may be released and dropped back for the purpose of applying new brake shoes and the like purposes I provide a hand-operated rod r. This rod extends forwardly and terminates in a handle r' which rests just above the forward end-piece of the truck frame. The rear end of the rod r is connected to a lever s which operates the unlocking plate s' of the take-up box. This plate s' is provided with slots t engaging pins projecting from the cheek-blocks p through the casing of the take-up box D'. These slots are so shaped, as indicated in Fig. 3, that when the rod r is pulled forwardly the pins are thrown toward the center of the box thus unlocking the take-up box and allowing the brake shoes to fall back.

The operation of the parts is as follows: When a pull is applied to the brake-applying rod A the live lever B which has no fixed pivot gives a rearward pull to the brake rod C, thereby applying the brakes to the forward pair of wheels and gives a forward pull to the live lever E thereby applying the brakes to the rear and middle pair of wheels. When the pull is relieved the brakes are released by the release spring c' and the spring d throws the live lever back to its initial position. If we assume that at the time the brakes are applied they are in the proper working condition, that is, that there is no slack in the system, the rod k will be moved backward to the limit of its slot k' as shown in Fig. 4 and the rod I will be moved forward to the limit of its slot l' without affecting the take-up mechanism. If, however, the brake shoes on the forward brakes have become worn this limit of movement will not be sufficient to apply the brakes, whereupon the engagement of the forward end of the slot k' with the pin on the floating lever f will turn that lever on its central pin as a pivot and slide the pawl box along its rack. If this movement is sufficient to move the box the length of a tooth the pawl will engage the next succeeding tooth and thereby take up the slack. In the same manner if the brake shoes of the middle wheels are worn the rear end of the slot l' will engage the middle pin of the floating lever and turn the lever on its lower pin as a pivot taking up the slack. This operation will ensue without a change in angular position of the live lever E if the middle brake shoes and the rear brake shoes are worn to the same extent. If the rear brake shoes are worn more than the middle brake shoes the middle brake shoes will at the forward movement of the live lever E be brought into engagement with their wheels. The live lever E will then turn upon its lower pin as a pivot until the rear brake shoes are applied, at the same time taking up the slack without affecting the position of the middle brake shoes. So, if the rear brake shoes are not worn and the middle brake shoes are, the forward movement of the live lever B will carry the live lever E with it until the rear brakes are applied and thereupon the live lever E will turn on its upper pin as a pivot until the middle brakes are applied, and the slack will be taken up without disturbing the rear brake shoes. It will be observed that these movements are entirely independent of the movements of the shoes of the forward wheels, that is to say, if there is no slack to be taken up on the rear or middle brake shoes and there is slack to be taken up in the forward brake shoes the live lever B will move forward until the rear and middle brakes are applied and will then turn on its central pin as a pivot until the forward brakes are applied, this additional movement causing the floating lever f to turn on its central pin as a pivot, the whole operation being accomplished without affecting the already correct position of the brakes on the rear and middle wheels. So if there is no slack to be taken up in the forward brakes, but there is in the rear or middle brakes, the live lever B will move forward until the forward brakes are applied and will then turn upon its lower pin as a pivot until the rear and middle brakes are applied. This additional movement causes the floating lever f to turn on its lower pin as a pivot and take up the slack without affecting the position of the forward brakes. After the slack has thus been taken up and on the return of the live lever B towards its initial position, the brake on all the wheels will drop back until the rear wall of the slot k' engages with the pin on the lower end of the lever f and the forward wall of the slot l' engages with the center pin of the lever f. This latter movement establishes a fixed fulcrum at the center of the floating lever f and since the pawl box cannot move in the rearward direction this lever is also fixed in position at its upper end. It, therefore, holds the forward shoes and the rear and middle shoes from further backward movement. As the live lever B returns toward its initial position, under the actuation of the spring d, the take up box V' is actuated to take up the slack in the system. That is to say, the rear end of the rod V and the head and cheek blocks thereon are held stationary by the rod I, but the forward half of the intermediate rod V moves backwardly causing the racks on the yoke end to slide over the cheek blocks and shorten the intermediate rod, thereby compensating for the slack in the system and leaving the parts in the proper condition for operation.

It will be seen that by my improved mechanism I provide a simple and efficient brake applying means for a six-wheel truck and at the same time a mechanism which will take up the slack automatically at each brake beam without affecting the other brake beam.

What I claim is:—

1. In a brake-applying mechanism for vehicles, a system of brake-applying rods and levers including a telescoping take-up device, and mechanism for actuating the take-up device comprising a floating lever, mechanism attached to one end of said lever adapted to permit the movement of that end in one direction and prevent its return movement in the other direction, connections extending from the brake-beams to the floating lever adapted to impart an excess movement of any brake-beam toward the wheels to the aforesaid end of the floating lever in the permitted direction and to limit the movement of the brake-beams away from the wheels, and a connection extending from the aforesaid parts to one portion of the telescoping take-up device, whereby on the application of the brakes slack in the system causes the floating lever to assume a new position, and on the release the take-up device is actuated to take up the slack in the system, substantially as described.

2. In a brake-applying mechanism for vehicles, a primary and a secondary live lever, connections from said levers to the respective brake beams, a two-part connecting rod between said levers, a take-up device interposed between the two parts of said rod, and mechanism for actuating the take-up device comprising a floating lever having a pivot capable of lateral movement, mechanism attached to the upper end of the said lever adapted to permit the movement of that end in one direction and prevent its return movement in the other direction, a connection including a lost motion device between the central portion of the floating lever and a brake-beam actuated by the secondary live lever, whereby an excess movement of such beam shifts the pivot of the floating lever, and a connection including a lost motion device between the lower portion of the floating lever and the brake-beam actuated by the primary live lever, whereby an excess movement of such beam turns the floating lever on its pivot, substantially as described.

3. In a brake-applying mechanism for six-wheel trucks, a freely suspended primary live lever, a brake-applying rod attached thereto above the center, a brake rod extending from the live lever below the center to the brake beam of the forward wheels, a freely suspended secondary live lever, a two-part connecting rod extending from the central portion of the primary live lever to the central portion of the secondary live lever, a take-up device interposed between the two parts of said rod, brake rods extending from the upper and lower portions of the secondary live lever to the rear and middle brake-beams, respectively, and mechanism for actuating the take-up device comprising a floating lever having a pivot capable of lateral movement, mechanism attached to the upper end of the said lever adapted to permit the movement of that end in one direction and prevent its return movement in the other direction, a connection including a lost motion device between the central portion of the floating lever and the secondary live lever, and a connection including a lost motion device between the lower portion of the floating lever and the brake-beam of the forward wheels, substantially as described.

4. In a brake-applying mechanism for six-wheel trucks, a freely suspended primary live lever, a brake-applying rod attached thereto above the center, a brake-rod extending from the primary live lever to the brake-beam of the forward wheels, a freely suspended secondary live lever, a two-part connecting rod extending from the central portion of the primary live lever to the central portion of the secondary live lever, a take-up box interposed between the two parts of said rod, brake rods extending from the upper and lower portions of the secondary live lever to the rear and middle brake-beams, respectively, a floating lever mounted in elongated bearings supported by the truck frame, a pawl-box, a rack upon which the pawl-box slides, a connection extending from the pawl-box to the upper end of the floating lever, an adjusting rod extending from the forward brake beam to the lower end of the floating lever and connected thereto by a lost motion device, and an adjusting rod extending from the secondary live lever to the central portion of the floating lever and connected thereto by a lost motion device, whereby upon application of the brakes the slack in any portion of the brake rigging causes the adjusting rods to adjust the position of the pawl box and establish a new fulcrum for the floating lever, and upon the release of the brakes the adjusting rods limit the movement of the secondary live lever and the forward brake beam, and the further return movement of the primary live lever actuates the take-up box to take up the slack in the system, substantially as described.

5. In a brake-applying mechanism, a two-part connecting rod, one part of which terminates in a yoke and the other part in a head sliding within said yoke, toothed racks on said yoke, toothed cheek blocks on said head spring pressed into engagement with said racks, a lever attached to said cheek blocks and adapted to withdraw them from said racks, and an actuating rod extending from said lever, substantially as described.

6. In a brake-applying mechanism, a two-part connecting rod, one part of which terminates in a yoke and the other part in a head sliding within said yoke, toothed racks on said yoke, toothed cheek blocks on said head spring pressed into engagement with said racks, an inclosing case for said yoke and head, pins on said blocks extending through the case, a slotted plate engaging said pins, a lever extending from said plate, and an actuating rod for said lever, whereby movement imparted to the plate through the rod and lever causes the slots to move the pins to withdraw the cheek blocks from engagement with the racks, substantially as described.

7. In a brake-applying mechanism for vehicle trucks, a tubular casing mounted on the truck-frame adjacent to the live lever, a spring within said casing, a piston in said casing actuated by the spring and a rod extending from the piston to the live lever; substantially as described.

8. In a brake applying mechanism for vehicle-trucks, a tubular casing mounted on the truck frame adjacent to the live lever, a compression spring within said casing, a piston in said casing actuated by the spring and a rod extending from the piston to the live lever, substantially as described.

In testimony whereof I affix my signature, in presence of two witnesses.

JAMES M. HINES.

Witnesses:
A. S. KENDALL,
THOMAS E. WALSH.